United States Patent [19]

Cukon

[11] Patent Number: 4,640,017
[45] Date of Patent: Feb. 3, 1987

[54] GOLF CLUB ADJUSTING MACHINE

[76] Inventor: Viktor Cukon, 1902 Golden Circle Dr., Escondido, Calif. 92026

[21] Appl. No.: 905,291

[22] Filed: Sep. 8, 1986

[51] Int. Cl.[4] .............................................. G01B 5/24
[52] U.S. Cl. ...................................... 33/508; 72/293
[58] Field of Search ............ 72/293; 273/32 R, 32 B; 33/508

[56] References Cited

U.S. PATENT DOCUMENTS

| | | |
|---|---|---|
| 1,675,437 | 7/1928 | Waldron . |
| 2,973,581 | 3/1961 | Rhodehamel . |
| 3,439,429 | 4/1969 | Sundstrom . |
| 4,094,072 | 6/1978 | Erb . |
| 4,245,391 | 1/1981 | Heller . |
| 4,245,392 | 1/1981 | Heller . |

FOREIGN PATENT DOCUMENTS 0002626  1/1977  Japan ..................................... 72/293

Primary Examiner—Harry N. Haroian
Attorney, Agent, or Firm—Lewis E. Massie

[57] ABSTRACT

A device for measuring and adjusting the angle of lie and face angle of a golf club including a club head supporting base vice with a reference surface for supporting the sole of the golf club. A spring mounted vertical scale is provided in a vertical plane mounted to each side of the base vice. Vertical supports with a horizontal threaded shaft therebetween supporting a threaded nut having a clevis for holding a bending wrench at various positions.

1 Claim, 10 Drawing Figures

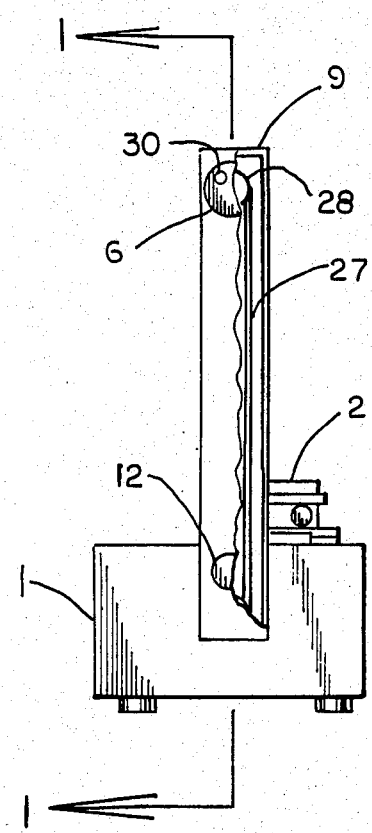
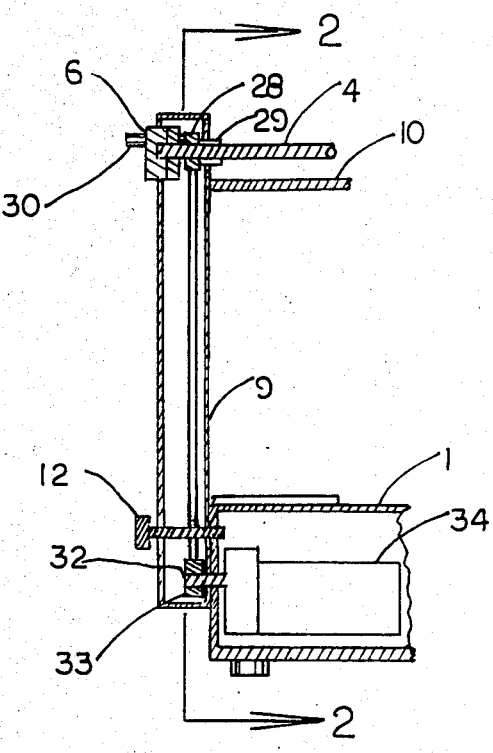
FIG.6  FIG.7
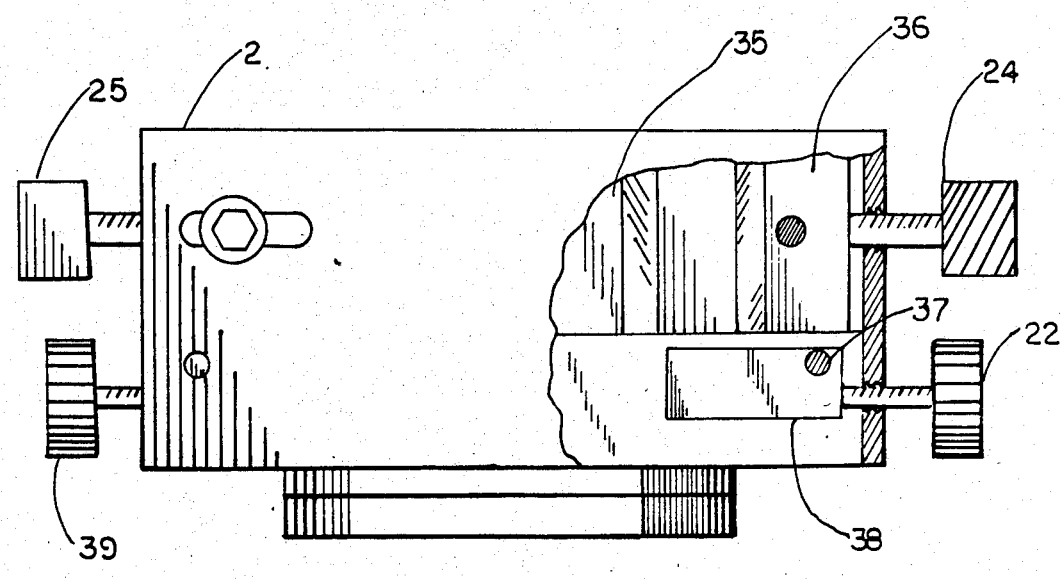
FIG.8

GOLF CLUB ADJUSTING MACHINE

BACKGROUND OF THE INVENTION

It is not practical for manufacturers of golf clubs to adjust the loft and lie angles of production golf clubs in accordance with the requirements of each specific golfer. Relating each club to the users height, arm length, and style of play is an exacting task for customizing the club to each user. Nor is it economically feasible for each golfer to have a set of clubs custom made. It is customary for buyers of golf clubs to adjust the purchased clubs for their own use. The present invention provides an improved machine that reads the lie and loft angle of a golf club and adjusts these angles to the new values desired.

THE RELATED ART

U.S. Pat. No. 1,675,437 to Waldron addresses the problem of adjusting the desired loft angle of a specific club by mounting the club in the proper position in a fixture and milling, or filing, the face of the club to the desired angle.

U.S. Pat. No. 2,973,581 to Rhodehamel has the golf club clamped to a base unit and the hostel bent manually by means of a wrench and a calibrated reference frame to adjust to the desired lie of the club. Then the club is removed from the base unit, tested and reinstalled in the base unit for manual bending to the proper loft angle.

U.S. Pat. No. 3,439,429 to Sundstrom is similar to Rhodehamel wherein the club head is accurately mounted in a hydraulic jack base and manually adjusted by means of a wrench.

U.S. Pat. No. 4,094,072 to Erb shows a similar device wherein the loft and lie angles of a golf club are adjusted by manually applying bending forces to the head of the golf club.

SUMMARY OF THE INVENTION

A box shaped base unit having a golf club holding vice centrally located on the top surface. The vice being rotatable in the horizontal plane of the base surface. An azimuth scale at the base of the vice indicating the rotation of the vice in relation to the top surface of the base. The vice having a fixed central jaw and two horizontally movable jaws, one on each side of the fixed jaw. The faces of the fixed jaw being perpendicular to the base. Hand knobs on threaded shafts adjust the movable vice jaws towards the fixed jaw. Adjustable rotating arms determine the depth of the vice retaining box.

A vertical scale outboard and on each side of the club vice having the scale surfaces in the same vertical plane as the vice is spring mounted so as to deflect backwards from the front normal position. Vertical supports, back of the scales, support a horizontal screw jack consisting of a threaded horizontal shaft with a rotatable threaded nut free to travel the length of the threaded shaft. The vertical shafts adjustable rotatable from the vertical position to a twenty eight degree back position.

The horizontal threaded shaft is driven by means of a sprocket chain and sprocket drive from a geared down electric motor mounted in the machine base. A three position electric switch, normally off, determines the rotation of the motor and the direction of travel of the screw jack.

DESCRIPTION OF THE DRAWINGS

FIG. 6 is a partial section view through 2—2 of FIG. 7.

FIG. 7 is a sectional view through 1—1 of FIG. 6.

FIG. 8 is a partial cross section view of the vice assembly.

DESCRIPTION OF THE PREFERRED EMBODIMENT

Figure 1:
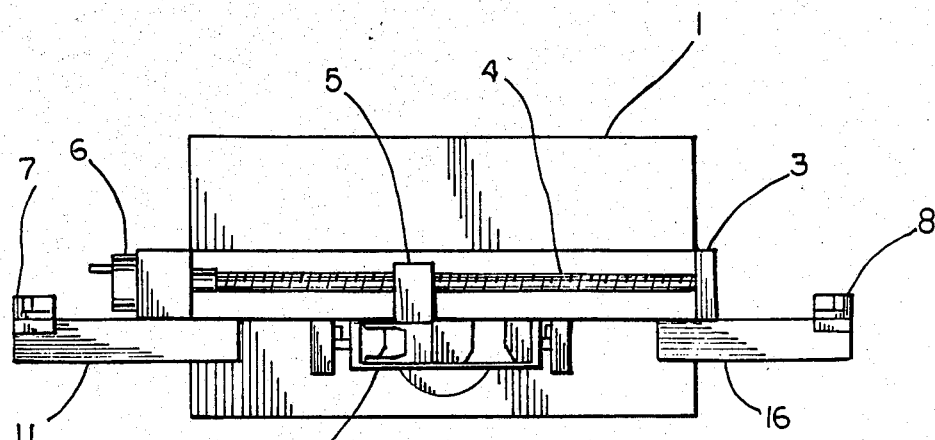
FIG. 1 is a top plan view of the golf club adjusting machine.
Figure 2:
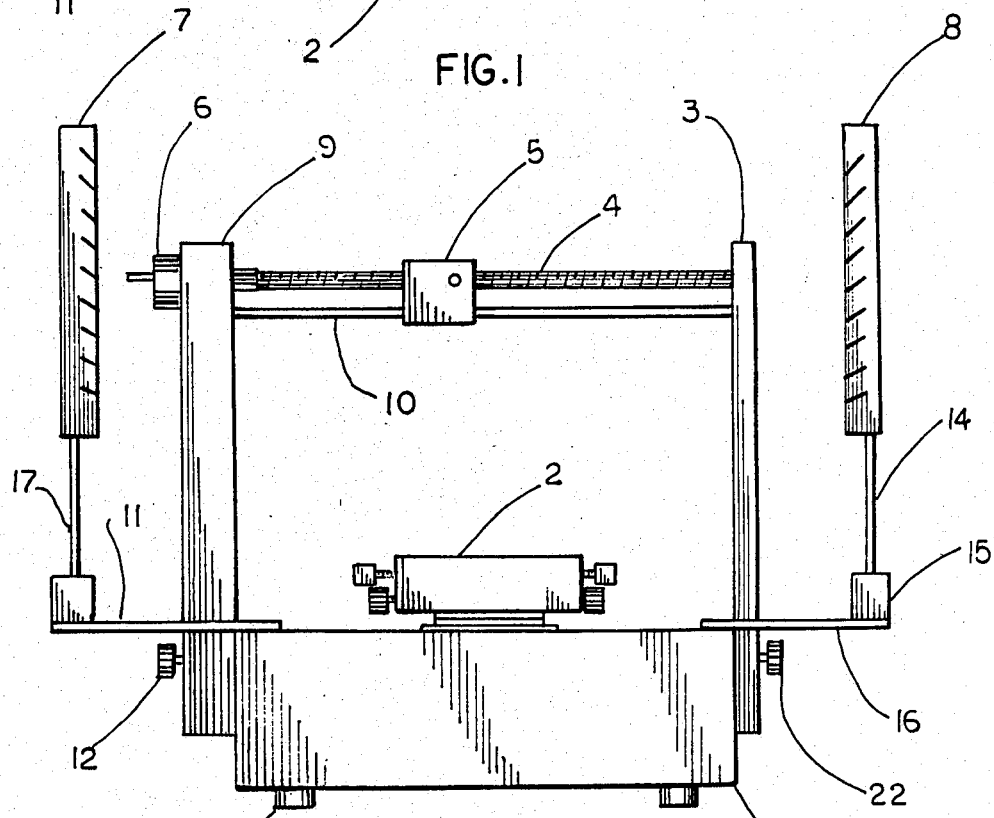
FIG. 2 is a front elevation of the golf club adjusting machine.
Figure 3:
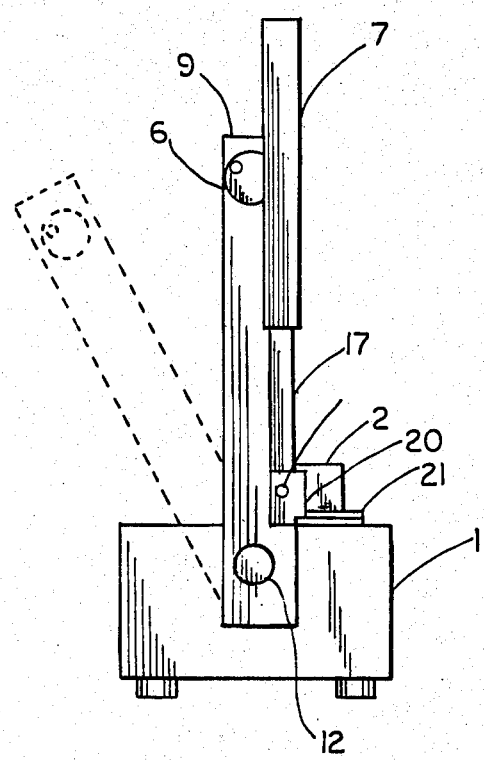
FIG. 3 is a left elevation view of the golf club adjusting machine.
Figure 4:
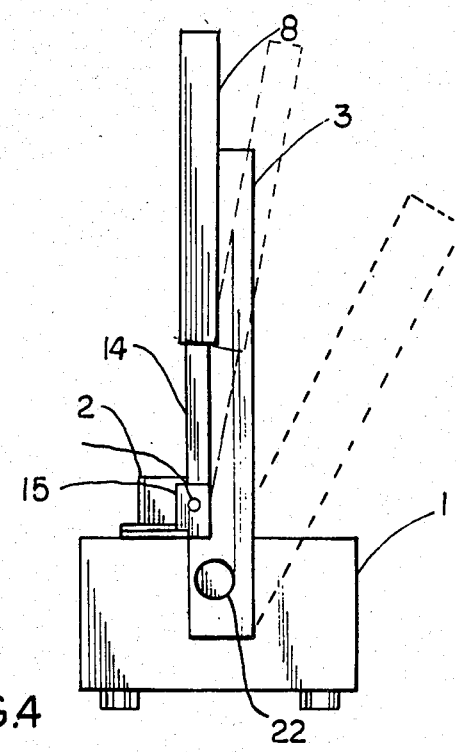
FIG. 4 is a right elevation view of the golf club adjusting machine.

Referring now to the drawing FIG. 2 shows a golf club adjusting machine according to the present invention. The base 1 having two vertical support members 3 and 9 in the same vertical plane supporting the horizontal screw jack assembly consisting of the threaded rod 4, threaded block 5 and manual knob 6. The support structure and screw jack adjustable in rotation by knobs 12 and 22. Vertical scales 7 and 8 with supporting structure 17, 11, 14, and 15 fastened to the top surface of base 1. A three position elecrical switch 23 mounted on top of base 1.

Figure 5:
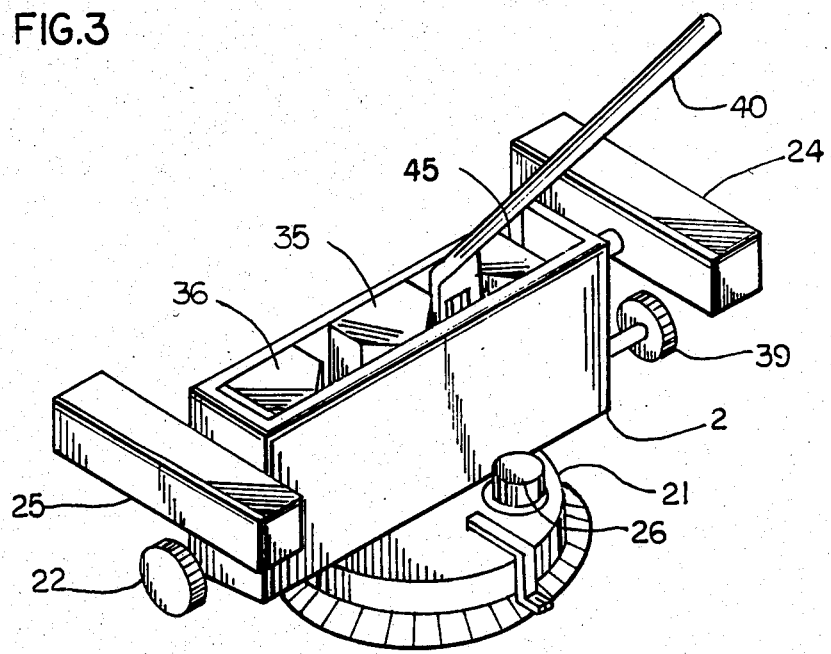
FIG. 5 is a top left back perspective view of the vice assembly.
Figure 9:
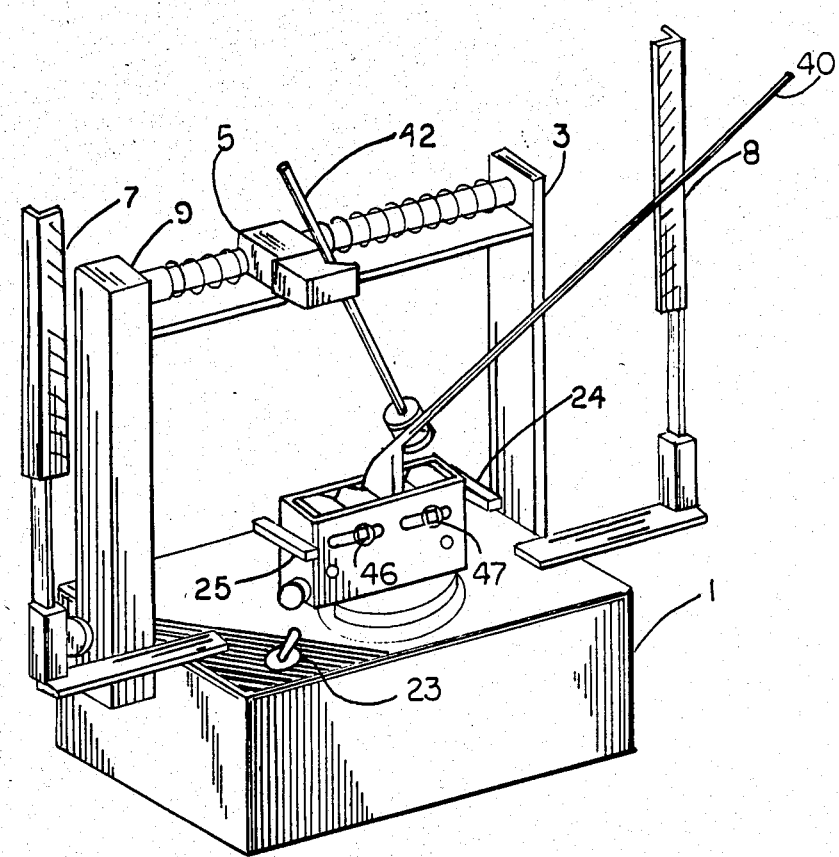
FIG. 9 is a top left front perspective view of the golf club adjusting machine.

Referring to FIG. 5 shows vice 2 with vice jaws 36, 35, and 45. Chuck jaw 35 being fixed in place with jaws 36 and 45 horizontally slidable adjusted by knobs 25 and 24. Rotational knobs 22 and 39 adjust the height of base 38. Locking knob 26 locks rotation of vice 2 on top of base 1.

Referring to FIGS. 6 and 7 shows screw jack rotational knob 30 with engagement pin 6 relative to its position with gear sprocket 28 and shaft bearing 29. Sprocket chain 27 engaging sprocket 28 and gear motor shaft sprocket 32 fastened to drive shaft on gear motor 34.

Referring to FIG. 8 shows the base adjusting knob 22 and base 38 rotating about pin 37.

Figure 10:
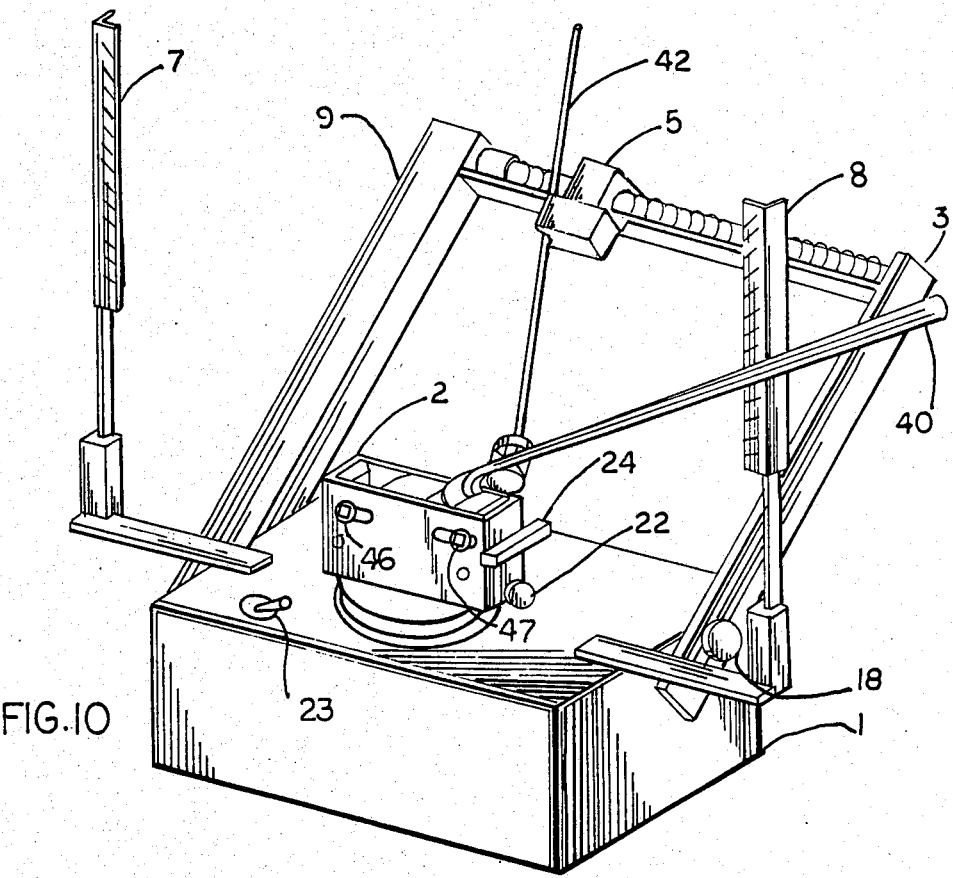
FIG. 10 is a top right front perspective view of the golf club machine with the vertical supports rotated backwards.

Referring to FIG. 10 shows the support structure 9 and 3 rotated 28 degrees to the back of base 1 around the axis of the motor 34 and bending wrench 42 engaging hostel of club 40.

In operation a right handed golf club 40 is mounted in the vice with the sole of the club contacting the vertical face of the fixed vice jaw 35. The toe of the club resting upon the bottom piece 38. Vice jaw 36 is then advanced by rotating knob 24 to secure golf club against vice jaw 35. The adjustment being locked in place by tightening nut 47. The angle of lie of the club is then read by the intersecting position of the golf club shaft 40 on the scale 8. To adjust the angle of lie disengage the knob 6 from the sprocket drive 28 by pulling out pin 30 and then rotating knob 6 to move screw jack nut 5 horizontally along threaded shaft 4 to a position wherein the bending wrench 42 engaging the hostel of the club 40 fits securely in the clevis on block 5. Press in pin 30 to engage shaft sprocket drive 28 and operate electric switch 23 to activate drive motor 34 to slowly bend wrench 42 in a straight line. Bend wrench 42 until the vertical scale 8 reading at the interface with the club shaft is approximately one and one half degrees past the desired value to allow for spring-back.

The angular reading in azimuth on the scale 21 at the base of the vice 2 provides the angle of loft of the club head with respect to the club shaft. To adjust the angle of loft rotate the screw jack support system backwards 28 degrees to permit club shaft 40 to clear the surface of vertical scale 8. Wrench 42 is then secured in the clevis of the nut 5 and locked on the golf club hostel. The electric motor is then activated to smoothly bend the club at the hostel to the new desired value.

The vice arrangement and vertical scales are duplicated so as to allow the measurement and adjustment of both right handed and left handed golf clubs.

What I claim is:

1. In devices for measuring and adjusting the angle of lie and loft of a golf club wherein the improvement comprises:
    (a) a base having a club holding vice centrally mounted on the top surface thereof;
    (b) the vice having a center fixed jaw and movable jaws on either side of the center jaw;
    (c) the vice rotatable in azimuth on the top of the base;
    (d) the faces of the center jaw of the vice vertical with respect to the base surface;
    (e) the bottom surface of the vice vertically adjustable;
    (f) a vertical scale, in the vertical plane of the vice, mounted to the base on each side of the vice;
    (g) the vertical scale spring mounted to allow deflection backwards from the normal front position;
    (h) rotatable vertical supports in a vertical plane back of the vertical scales supporting a horizontal threaded shaft;
    (i) a threaded nut on the horizontal shaft driven side to side by rotation of the shaft forming a screw jack;
    (j) a chain and sprocket drive from a base mounted, down-geared electrical motor driving the horizontal shaft;
    (k) a manual control for disengaging the sprocket drive for manually rotating the threaded shaft;
    (l) the threaded nut on the screw jack having a clevis for holding a bending wrench; and
    (m) the bending wrench having a clevis on the lower end for engaging the hostel of a golf club.

* * * * *